(12) United States Patent
Nagao

(10) Patent No.: US 10,963,192 B2
(45) Date of Patent: Mar. 30, 2021

(54) IMAGE PROCESSING APPARATUS, LIST DISPLAY GENERATOR, AND LIST DISPLAY METHOD

(71) Applicant: SHARP KABUSHIKI KAISHA, Sakai (JP)

(72) Inventor: Tsuyoshi Nagao, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/681,489

(22) Filed: Nov. 12, 2019

(65) Prior Publication Data

US 2020/0150906 A1    May 14, 2020

(30) Foreign Application Priority Data

Nov. 14, 2018 (JP) .............................. JP2018-214004

(51) Int. Cl.
*G06F 3/12* (2006.01)
*H04N 1/00* (2006.01)

(52) U.S. Cl.
CPC .......... *G06F 3/1204* (2013.01); *G06F 3/1246* (2013.01); *G06F 3/1285* (2013.01); *H04N 1/00411* (2013.01)

(58) Field of Classification Search
CPC .... G06F 3/1204; G06F 3/1246; G06F 3/1285; G06F 3/1271; G06F 3/121; G06F 16/10; G06F 16/116; H04N 1/00411; H04N 1/00408; H04N 2201/3226
See application file for complete search history.

(56) References Cited

U.S. PATENT DOCUMENTS

| | | | |
|---|---|---|---|
| 2008/0239384 A1* | 10/2008 | Kadota ................. | G06F 3/1258 358/1.15 |
| 2011/0222117 A1* | 9/2011 | Inose ................... | H04N 1/0048 358/1.15 |
| 2018/0144426 A1* | 5/2018 | Grbac .................... | G06F 16/48 |

FOREIGN PATENT DOCUMENTS

JP          5489792 B2      5/2014

* cited by examiner

*Primary Examiner* — Iriana Cruz
(74) *Attorney, Agent, or Firm* — ScienBiziP, P.C.

(57) ABSTRACT

An image processing apparatus includes a list acquirer that acquires a display object that is at least one of a folder and a file including a name and a type serving as an attribute; a display name decider that decides whether a name relating to a display object is named according to the type, on the basis of predetermined rules for displaying a list, and if not a name according to a type, adds an identifier to the name according to the type; and a list generator that displays the display object in the list by utilizing the name for an acquired display object or the name having an identifier added based on a decision by the display name decider.

4 Claims, 14 Drawing Sheets

FIG. 3A

| FOLDER 1 | (ATTRIBUTE) | VALUE |
|---|---|---|
| | ID: | 1 |
| | NAME: | Meetings |
| | TYPE: | GENERAL |
| | CREATION DATE: | 2018.9.9 2:29:46 |
| FOLDER 2 | (ATTRIBUTE) | VALUE |
| | ID: | 2 |
| | NAME: | Meetings |
| | TYPE: | SHARE |
| | CREATION DATE: | 2018.6.14 3:29:46 |

FIG. 3B

```
{
    "folders": [{
                "id": 1,
                "name": "Meetings",
                "kind": "general",
                "created_at": "2018-09-09T02:29:46.000Z"
        },
        {
                "id": 2,
                "name": "Meetings",
                "kind": "share",
                "created_at": "2018-06-14T03:29:46.000Z"
        }
    ]
}
```

EXPLANATORY NOTE: · id(FOLDER IDENTIFIER)
· name(FOLDER NAME)
· kind(FOLDER TYPE)
  general: GENERAL FOLDER, share: SHARED FOLDER
· created_at(FOLDER CREATION DATE)

FIG. 4A

| FILE 1 | (ATTRIBUTE) | VALUE |
|---|---|---|
|  | ID: | 1 |
|  | NAME: | Report.PDF |
|  | TYPE: | pdf |
|  | UPDATE DATE: | 2018.2.14 3:29:46 |
| FILE 2 | (ATTRIBUTE) | VALUE |
|  | ID: | 2 |
|  | NAME: | Report A |
|  | TYPE: | document x |
|  | CREATION DATE: | 2018.4.14 5:29:46 |
| FILE 3 | (ATTRIBUTE) | VALUE |
|  | ID: | 3 |
|  | NAME: | Report A |
|  | TYPE: | spreadsheet y |
|  | CREATION DATE: | 2018.6.14 7:29:46 |

FIG. 4B

```
{
    "files": [{
                "id": 1,
                "name": "Report.PDF",
                "kind": "pdf",
                "updated_at": "2018-02-14T03:29:46.000Z"
            },
            {
                "id": 2,
                "name": "Report A",
                "kind": "document_x",
                "updated_at": "2018-04-14T05:29:46.000Z"
            },
            {
                "id": 3,
                "name": "Report A",
                "kind": "spreadsheet_y",
                "updated_at": "2018-06-14T07:29:46.000Z"
            }
    ]
}
```

EXPLANATORY NOTE:
- id(FILE IDENTIFIER)
- name(FILE NAME)
- kind(FILE TYPE)    pdf: PDF FILE, document_x: DOCUMENT X, spreadsheet_y: SPREADSHEET Y
- updated_at(FILE UPDATE DATE)

| ATTRIBUTE: TYPE | ADDITIONAL CHARACTER STRING |
|---|---|
| DOCUMENT X | .XDOC |
| SPREADSHEET Y | .YSHEET |
| SHARED FOLDER | (Share) |

IMAGE PROCESSING APPARATUS, LIST DISPLAY GENERATOR, AND LIST DISPLAY METHOD

BACKGROUND OF THE INVENTION

Field of the Invention

This invention relates to an image processing apparatus and list display method that acquires at least one of a folder and a file as a display object and displays the display object that is acquired in a list.

Description of the Background Art

In an image processing apparatus that processes image data such as from a scanner, a printer, or a multifunction peripheral (MFP) combining such devices, in some situations the image processing apparatus accepts selection of the image data for processing by a user and processes a selected file. In this specification, the image data for processing is treated as one file.

A list of folders and files is acquired along with attributes so the user can select the processing object. The list is displayed using attribute values such as names for the acquired folders. Along with the names, other attribute values may also be displayed such as the update date. The acquired files are displayed in the same way by using attribute values such as the names, etc. Along with the names, the update date, size, password (or not) etc. and other attribute values may be displayed.

The user utilizes the displayed list to select the processing object.

A typical example of the above described situation is the case of printing data stored on a computer coupled to an image processing apparatus directly or via a network, etc. The user is shown on a list and selects the file to print on the image processing apparatus by utilizing a function supported by the operating system of the computer. Software (called a device driver) that serves as the interface with the image processing apparatus is pre-installed on the computer. The device driver processes the selected file and sends the file to the image processing apparatus. In this example, the attributes assigned to an object file are managed by the operating system and when the operating system displays the file list, the attribute values managed by the operating system are displayed unchanged in their current state.

However, in recent years, along with advances in communication technology and improvements in the communication infrastructure, image processing apparatuses are being coupled to computers of widely varying types and models. Operating systems of diverse types capable of managing file attributes are available.

In addition, various cloud services are currently provided. As one example, Google (registered trademark) provides a cloud service called Google Cloud Platform (GCP). Not limited to only Google, other companies also offer the same cloud services.

In the case of GCP, Google has made a number of applications available for free so that not only specialist users such as software developers but also ordinary business users can easily utilize GCP. For example, applications for mail, schedule management, creating and editing of documents, creating and editing of spreadsheets, and creating and editing presentations are available.

The cloud service is not aware of the location of the object file and the operating system of the device that stores the file. The attributes assigned to the object file are managed by the cloud service.

Currently, the attributes assigned to folders and files are not completely standardized, and there are variations due to differences between operating systems and cloud services.

On the other hand, image processing apparatuses have different functions depending on the manufacturer and model. Therefore, the manufacturer of the image processing apparatus usually prepares interface software (device driver or software corresponding to the function) according to the model to provide to the user. Generally, several types of interface software are usually prepared for one model in order to adapt to various operating systems and cloud services. Among such interface software, the device driver is installed on the computer side.

Installing interface software relating to the cloud service, on the cloud server side is not practical. Even if installed on the cloud server side, interface software for dozens of different models from various manufacturers would also have to be installed thus causing redundancy.

However, installing the interface software on terminals of users using the cloud service is not practical either. Cloud Services offer users the advantage of output to any nearby image processing apparatus without establishing limits on the image processing apparatuses. Even if the interface software could be installed on each user terminal, installing interface software for dozens of different models from various manufacturers would still prove necessary.

Therefore, performing the interface processing on the image processing apparatus side can be called a practical technique. In that case, a user interface for (showing) a list display for selecting the processing object is practical as shown below. Namely, each user terminal accesses the image processing apparatus by using a browser. The image processing apparatus provides for example, the contents of a list to display on the terminal side as an HTML file.

The following technologies are known in relation to selecting objects relating to such type of image processing. Technology is available to perform printing when data stored in an external device related to an external service such as a cloud service is shown on a list on the browser or to display only data in a transmittable format utilizing a scanner function. (See for example Japanese Unexamined Patent Application Publication No. 5489792).

When a user selects an object to process from a file displayed in a list, a file name is the first item referred to as a basis for making a judgment. However, the name is also one of the attributes utilized for file management by the operating system and the cloud service so there are differences depending on the operating system or the cloud service. For example, on the operating system level, an extension (filename extension) is added to the file name and is stored in the server. However, certain cloud services manage files by using the remainder after eliminating the filename extension as the file name. Consequently, the name provided by the cloud service as an attribute is the original file name without the filename extension.

Here, consider the case where there is a plurality of files that are identical except for the filename extension in a list. The server operating system treats the files as different names because of their different filename extensions so there is no processing to avoid redundancy (duplicate file name warnings and automatically adding filename extensions). However, the names acquired from the cloud service by the image processing apparatus do not have a filename extension and so cannot be identified by their names. Though the files can be identified by referring to a type as the attribute that the cloud service provides, there are many list displays with a format displaying only the file name. Even in other cases, whether the user will be able to refer to attributes other than the file name to carefully identify the file is unknown. The user might therefore mistakenly select a file with the same name.

In view of the above described circumstances, the present invention provides an image processing apparatus and a list display method that allow the user to easily identify both the folder and file by a name in cases where files or folders of different types are displayed with the same name on the list.

SUMMARY OF THE INVENTION

The present invention provides an image processing apparatus that includes a list acquirer that acquires a display object as an object for a list and that is at least one of a folder and a file, the display object including a name and a type as an attribute, a display name decider that decides whether the name relating to the display object is named according to the type, on the basis of predetermined rules for displaying a list, and if not the name according to the type, adds an identifier according to type to the name, and a list generator that displays the display object in the list by utilizing the name for the acquired display object or the name that an identifier is added to, on the basis of a decision by the display name decider.

The present invention as seen from another aspect, provides a list display method in which an image processing apparatus includes a controller that executes the list display method. The list display method includes acquiring a display object that is at least one of a folder and a file serving as a display object including a name and a type as attributes, deciding whether the name relating to the display object is named according to the type, on the basis of predetermined rules for displaying the list, and if not the name according to the type, adding an identifier according to type to the name, and displaying the display object in a list by utilizing the acquired name for the display object or the name that the identifier is added to, on the basis of the deciding.

The image processing apparatus according to the present invention includes a display name decider that decides whether a name relating to a folder or a file is a name according to the type, on the basis of predetermined rules for displaying the list and adds an identifier according to type to the name if not the name according to the type. Therefore, the image processing apparatus can display folders or files so that the user can easily identify folders and files in a list even when the folders or files have the same name but of different types.

The same also applies to the list display method according to the present invention.

BRIEF DESCRIPTION OF THE DRAWINGS

FIG. 3A is a descriptive view showing an example of information relating to a folder that an image processing apparatus acquires from an external service in this embodiment;

FIG. 3B is a descriptive view showing an example in which the information shown in FIG. 3A is expressed as JavaScript Object Notation (JSON) format data;

FIG. 4A is a descriptive view showing an example of information relating to a file that an image processing apparatus acquires from an external service in this embodiment;

FIG. 4B is a descriptive view showing an example in which the information shown in FIG. 4A is expressed as JSON format data;

DESCRIPTION OF THE PREFERRED EMBODIMENTS

Figure 1:
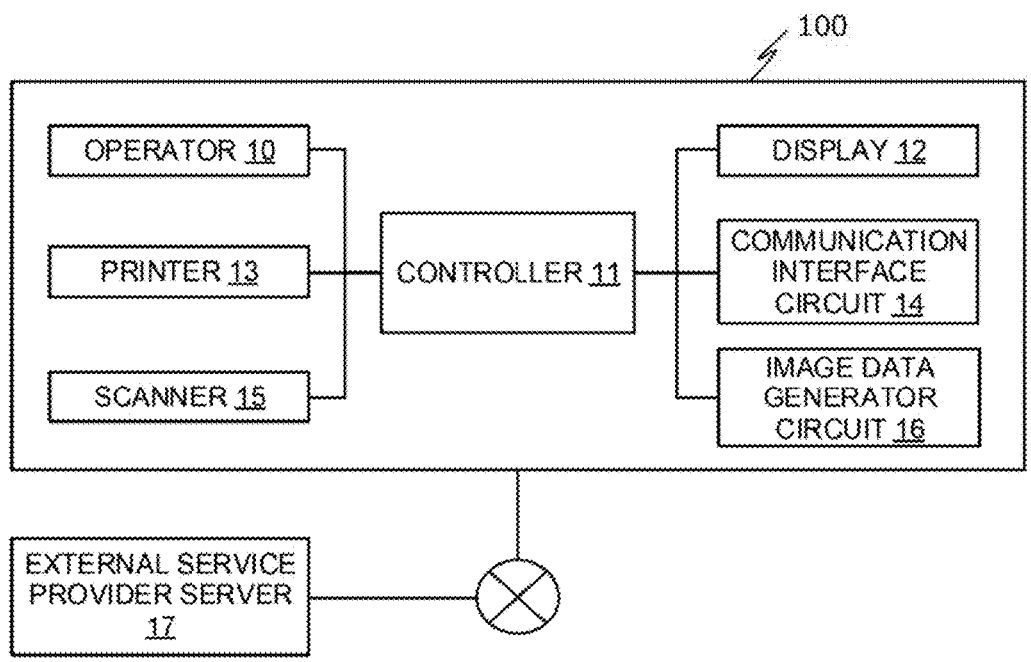
FIG. 1 is a block diagram showing a configuration of an image processing apparatus according to this embodiment.

The present invention is hereinafter described in further detail while referring to the drawings. However, the following descriptions are in all respects merely examples that should not be construed as limiting the present invention.

Image Processing Device Configuration

Figure 2:
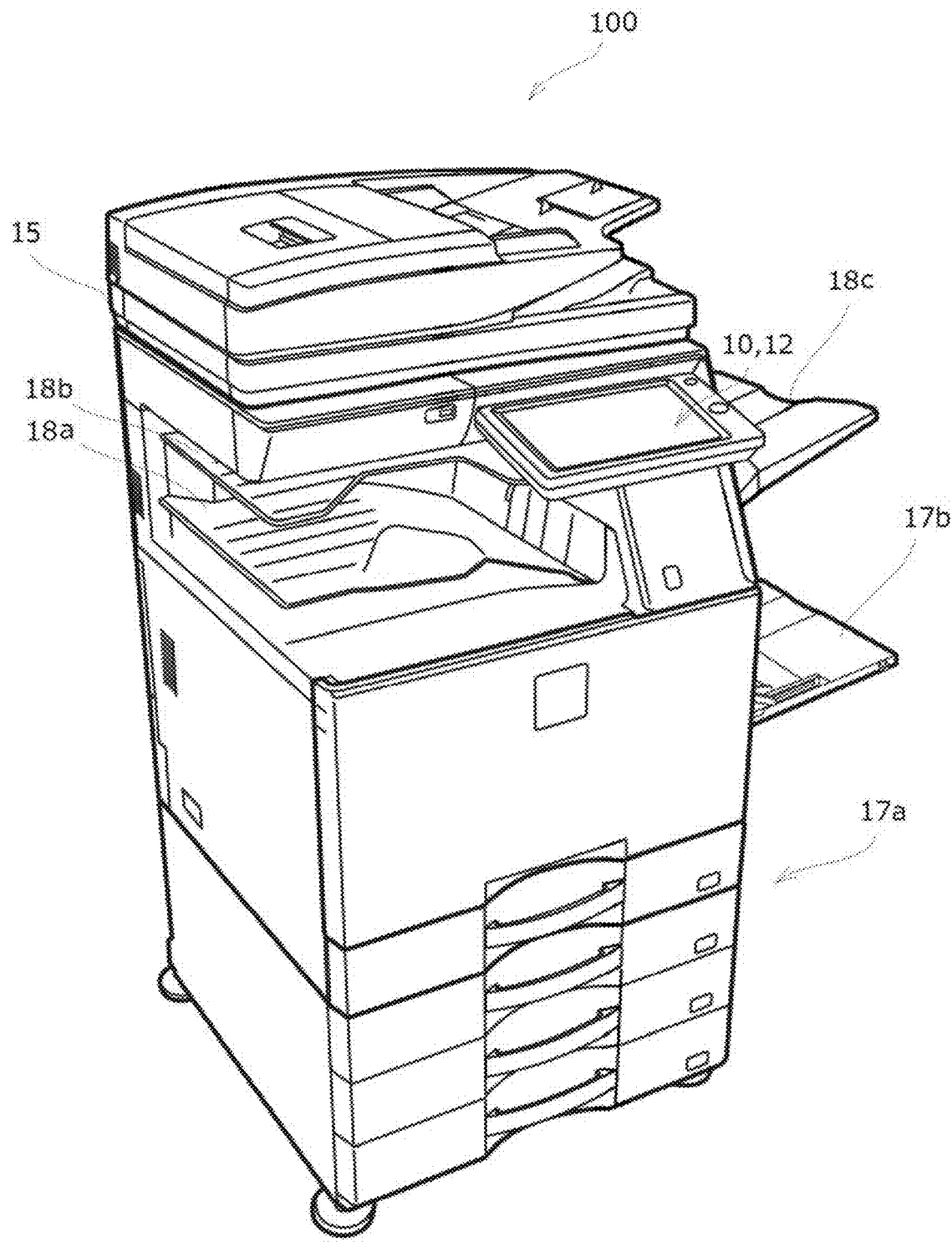
FIG. 2 is a perspective view showing the external appearance of the digital multifunction peripheral shown in FIG. 1.

FIG. 1 is a block diagram showing the configuration of a digital multifunction peripheral (MFP) as an aspect of the image processing apparatus according to this embodiment. FIG. 2 is a perspective view showing the external appearance of the digital multifunction peripheral shown in FIG. 1.

A digital multifunction peripheral is given as an example of an image processing apparatus of this embodiment however the present invention is not limited to a digital multifunction peripheral. For example, devices such as a scanner device, a copy device, a facsimile device, and a printer device may be used. As long as the device relates to the processing of image data, it is not limited to the above described devices.

As shown in FIG. 1, the image processing apparatus 100 includes an operator 10, a controller 11, a display 12, a printer 13, a communication interface circuit 14, a scanner 15, and an image data generator circuit 16. In addition, the image processing apparatus also couples to the external service provider server 17 by way of the communication interface circuit 14.

As shown in FIG. 2, the image processing apparatus 100 includes a paper feed tray 17a, the discharge trays 18a, 18b and 18c, and a hand insertion tray 17b.

The controller 11 and the printer 13, and the controller 11 and the scanner 15 are coupled by a bus and can mutually communicate with each other.

The controller 11 controls the operation of each portion of the image processing apparatus 100 shown in FIG. 1. Specifically, the controller 11 is configured from a central processing unit (CPU) or a microprocessor unit (MPU) as the core, and hardware resources such as a memory, input-output interface circuit, and a timer circuit.

The controller 11 includes a CPU as a processor, and a random access memory (RAM) and a read only memory (ROM) as memories. At least a portion of the ROM may be a rewritable nonvolatile memory. The CPU reads (loads) a control program stored in the ROM and develops the control program on the RAM as appropriate, and executes processing according to the control program developed on the RAM. Control of the image processing apparatus 100 is achieved by way of this processing.

The CPU shows the display relating to a user interface on the display 12 according to the control program stored in the ROM. The CPU also accepts the operation input from the user input by way of the operator 10. The CPU also complies with the control program to control the hardware of the image processing apparatus 100 and achieve functions such as print processing.

The controller 11 controls the image processing apparatus 100 by the CPU executing the control program stored in the ROM and through joint control with the hardware resources of the image processing apparatus 100.

The operator 10 is mounted on the housing of the image processing apparatus 100 and includes a plurality of operation buttons for accepting user (input) operations and a touch panel arranged on the display surface of the display 12 described below. The controller 11 recognizes signals indicating an input operation to the operator 10.

The display 12 includes for example, a liquid crystal display device. The display 12 can display various information and images, etc. on the basis of the input, etc. received for example by the operator 10.

The controller 11 generates and updates the content to be shown on the display 12. The display 12 also displays various information and images along with the content.

The controller 11 is coupled to a scanner 15 that scans the document image. The scanner 15 performs image scanning for the copy, facsimile, or scanner job under the control of the controller 11. In other words, the scanner 15 scans the document image and converts it into an image signal.

The image data generator circuit 16 generates image data based on the image signal output by the scanner 15.

The paper feed tray 17a is a plurality of trays that respectively accommodate various paper sizes.

The hand insertion tray 17b is a tray that can feed various sizes and types of paper.

The paper feed mechanism not shown in FIGS. 1 and 2 feeds the paper from the specified paper tray to inside a printing apparatus and conveys it to the printer 13 under the control of the controller 11.

The printer 13 prints specified image data onto the paper fed from the paper feed tray 17a or the hand insertion tray 17b under the control of the controller 11.

A paper eject mechanism not shown in FIGS. 1 and 2 ejects the paper printed by the printer 13 to one of the discharge trays 18a, 18b, and 18c.

The communication interface circuit 14 is an interface for data communication with an external device via the network. In the present embodiment, the image processing apparatus 100 communicates with the external service provider server 17 that is coupled via the network. The external service provider server 17 stores the image data that is scanned by the scanner 15 and generated by the image data generator circuit 16. The stored image data is also provided to the printer 13 for printing.

In the present embodiment, a specific aspect of the external service is the cloud service. Besides providing storage space on the cloud server to the user for a fee or free of charge, an application is also provided by the external service. The user of the cloud service creates or edits the data by using the application provided by the external service. The data that is created, is stored in the storage space on the cloud server.

When a user prints a file stored in the storage space, the user accesses the external service using a web browser and displays a list of the files stored in the storage space. The user selects the file for printing from among the files in the display list.

The following describes the process by which a user scans a document to generate image data and stores the generated image data in the storage space. The user specifies the storage location for the image data generated prior to scanning the document. The operation can be performed by using the operator 10 of the image processing apparatus 100. Namely, the user accesses an external service by using a web browser to display the folder created on the storage space in a list. The user then selects the folder to store the image data from the folders in the list.

Information Acquired from the External Service

FIG. 3A is a descriptive view showing an example of information relating to a folder acquired by the image processing apparatus 100 from the external service provider server 17 in this embodiment. FIG. 3B is a descriptive view showing an example of notation for JSON format data for the information shown in FIG. 3A.

In the examples shown in FIGS. 3A and 3B, there are two folders identified by the folder identifiers (ID) 1 and 2 in the folder as the display objects in the list. A folder identifier (ID/id), a folder name (name/name), a folder type (type/kind), a date and time that the folder is created (created/created_at) are provided for each folder.

Specifically, both folders with ID=1 and ID=2 have the same name "Meetings". Though the folder type with ID=1 is general (not a shared folder), the folder with ID=2 is a shared folder. In addition, information is provided relating to the creation date of each folder.

FIG. 4A is a descriptive view showing an example of information relating to a file that is acquired by the image processing apparatus 100 from the external service provider server 17 in this embodiment. FIG. 4B is a descriptive view showing an example of notation for JSON format data for the information shown in FIG. 4A.

In the examples shown in FIGS. 4A and 4B, there are three files identified by the folder identifiers (ID) 1, 2, and 3 in the folder as the display object in the list. As the attributes, each file includes a folder identifier (ID/id), a folder name (name/name), a folder type (type/kind), and the most recent date and time that the folder is created or updated (updated/updated_at).

Specifically, the file name of the file with ID=1 is "Report.PDF". For ID=2, ID=3, the file name is the same name "Report A". The file type with ID=1 is a PDF file. A file with ID=2 is a file created and edited by Document X that is a document creation application provided by an external service. The file with ID=3 is a file created and edited by Spreadsheet Y that is a business form creation application provided by an external service. In addition, information relating to the update date of each file is provided.

Folder and File List Display

When the controller 11 of the image processing apparatuses 100 requests information relating to the user data that is present in the storage space to the external service provider server 17, the external service provider server 17 responds to the request and data is provided as shown in FIGS. 3B and 4B.

In this embodiment, the controller 11 provides display data relating to the folder and file list display as a hypertext markup language (HTML) file based on the information acquired from the external service provider server 17.

In this embodiment, the list of folders and files is shown on the display 12 of the image processing apparatus 100. However, the present invention is not limited to this arrangement, and the list can also be displayed on the information processing device such as a PC or a smartphone used by a user that can communicate with the image processing apparatus 100 via the communication interface circuit 14.

To simplify the description for understanding the features of this embodiment, the conventional folder and file list display state will first of all be described.

Figures 5, 6:
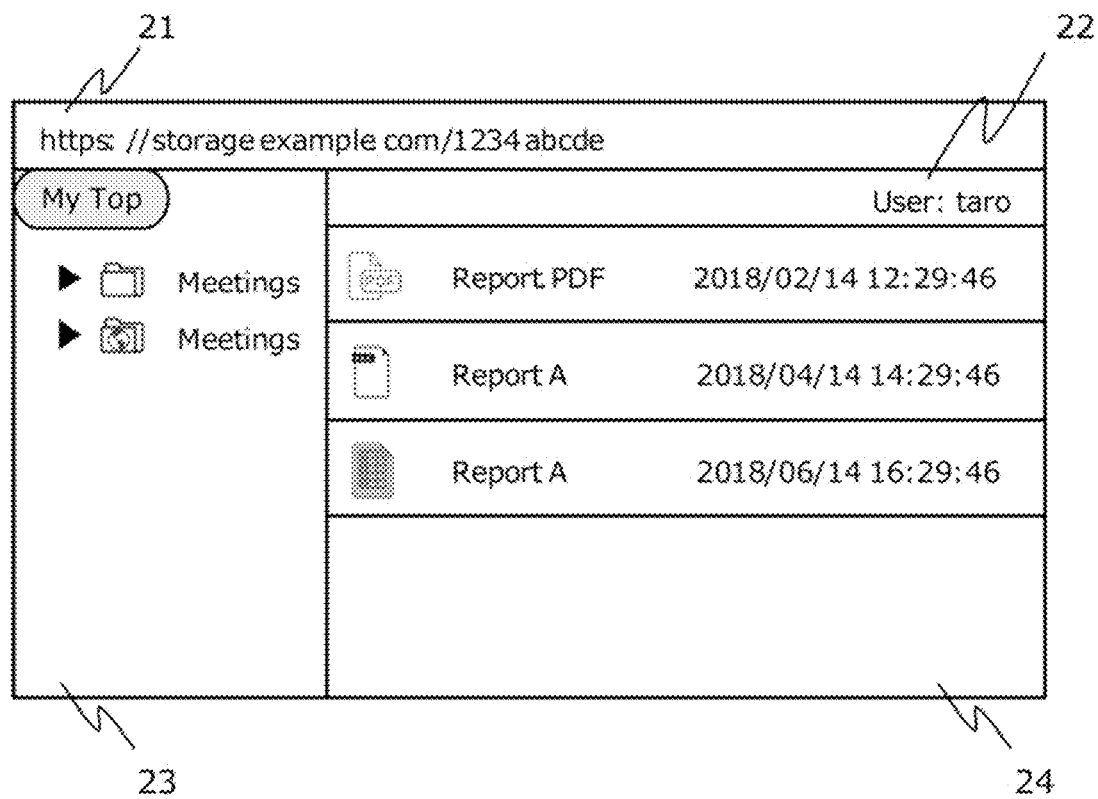
FIG. 5 is a descriptive view showing an example of a conventional display when a file stored in an external service is shown on a list display on a web browser.
FIG. 6 is a descriptive view showing identifiers added by a controller according to the type of folder or file in this embodiment.

FIG. 5 is a descriptive view showing an example of a conventional display when a file stored on an external service provider server 17 is shown on the list display on a web browser.

In FIG. 5, the uniform resource locator (URL) display 21 is arranged at the upper end of the display screen. The URL display 21 shows the access destination to the service provided by the external service. In the example shown in FIG. 5, "https://storage.example.com/1234abcde" is the URL of the access destination.

A folder list display 23 is shown on the left side under the URL display 21.

The folder list display 23 shows the folders that are present in the storage space on the cloud server in a tree format. The folder type and the currently selected folder are also displayed. In the example shown in FIG. 5, a folder "My Top" is being selected. There are two folders under the folder "My Top", both of the folders have the same name "Meetings". This name is also shown in FIGS. 3A and 3B. One folder type is a general folder and the other folder type is a shared folder. Both have different icon designs. The icon design corresponds to the folder type. Namely, the external service identifies and manages both of these different types even if the folder names are the same.

The controller 11 uses only the attribute name to identify the folder, and the difference in type is expressed only by the icon design.

In recent years, the storage space capacity of cloud services has become larger and it is now common for many users to share storage space. The folder structure and folder naming rules are managed in an orderly arrangement by the administrator as an implicit condition so cases may arise where the conventional method is not suitable.

In this example, the user cannot determine whether "Meetings" is a regular folder or a shared folder based only on the folder name. If no consideration is given to the icon design in order to identify both folders, the user might possibly select the wrong folder.

The description of the display screen in FIG. 5 continues here. A user display 22 and a file list display 24 are displayed in order from the top on the right side of the folder list display 23.

The user display 22 shows the name of the user currently coupled to the external service. In the example shown in FIG. 5, "taro" is the user name.

The file list display 24 shows a list of currently selected folders, namely the files in "My Top". An icon, a file name, and a last update date are displayed for each file.

Three files are show in a list in the example in FIG. 5. Starting from the top, there are a total of three file names. These are "Report.PDF", and "Report A" and "Report A" have the same file name. These names correspond to the names in FIGS. 4A and 4B. The file types are respectively PDF file, Document X, and Spreadsheet Y.

The Document X and Spreadsheet Y each correspond to a specific application provided by an external service. In other words, the document creation application provided by the external service generates a file relating to Document X. The external service also provides a business form creation application that generates a file relating to Spreadsheet Y. The icon design corresponds to the file type.

In the example shown in FIG. 5, the two files with the same file name "Report A" are different file types. One file is Document X and the other file is Spreadsheet Y. However, there is no extension attached to the file name and the names are the same. The only difference in the display is the icon design. The user cannot decide whether "Report A" is related to Document X or Spreadsheet Y based only on the file name. If the icon design is not taken into consideration for identifying both files then the user might possibly select the wrong file.

So far, we have described specific examples of conventional screen displays and their problems.

First Embodiment

The folder and file list display process according to this embodiment are described as follows.

In this embodiment, the controller 11 does not generate the display data for the folder name and file name by using the attribute name as described above. The controller 11 adds an identifier to the folder name and file name, on the basis of predetermined rules. The identifier in this embodiment is a character string determined in advance based on the type of folder or file.

FIG. 6 is a correspondence table for additional character strings that the controller 11 sets corresponding to each type of the folder or the file in this embodiment. As shown in FIG. 6, the controller 11 adds an extension ".XDOC" to the name of a "Document X" file type. The controller 11 adds an extension ".YSHEET" to a file name of a "Spreadsheet Y" file type. By adding an extension to the file name in this way, the user can easily identify the file even if there is a file with a same name but of a different type.

The controller 11 further adds "(Share)" to the folder name in the case of a shared folder. As a result, the folder name can easily be identified by the user even if there is a folder with the same name but of a different type.

Figure 7:
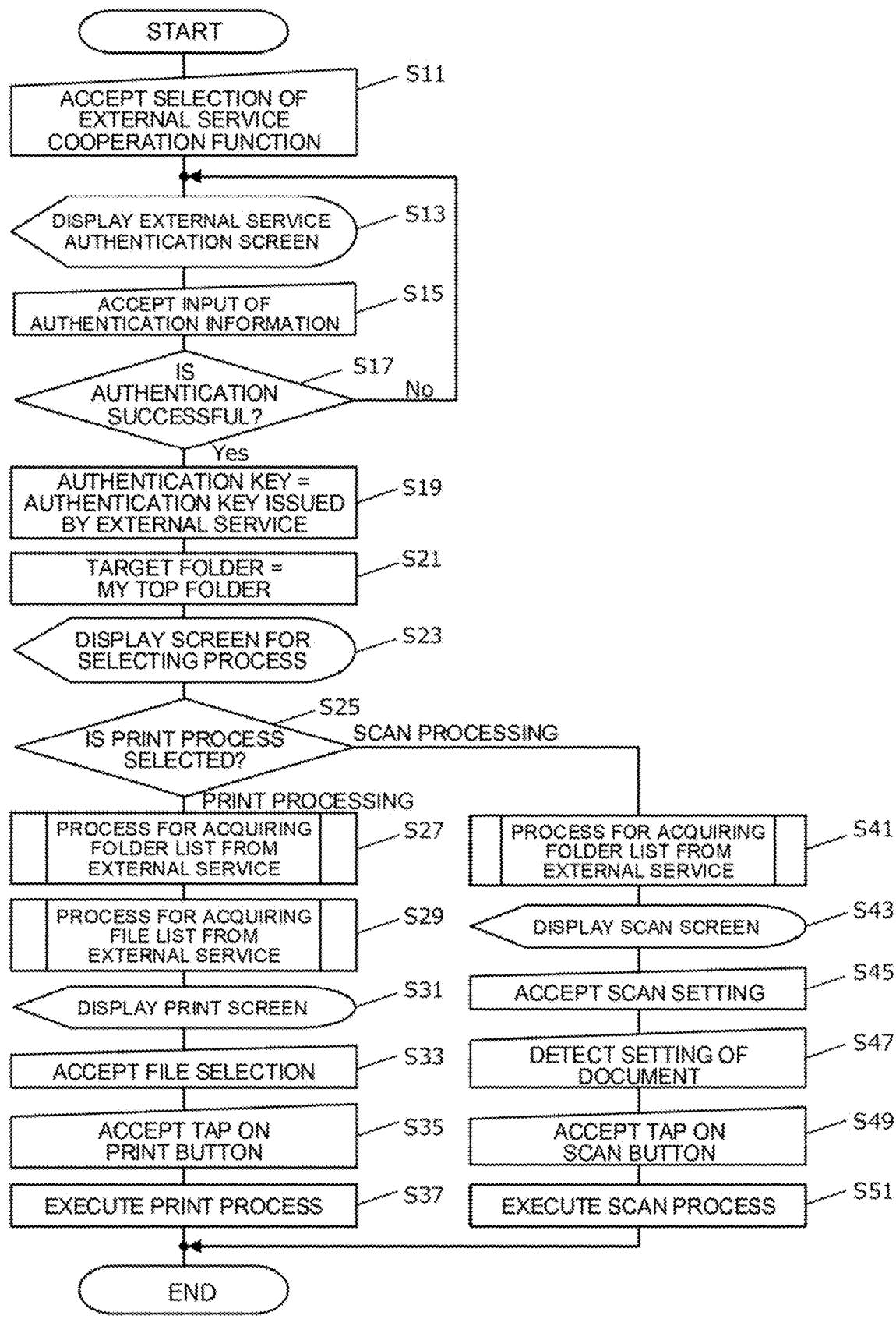
FIG. 7 is a flowchart showing the flow for the controller shown in FIG. 1 to accept an instruction from a user and execute print processing and scan processing.

FIG. 7 is a flowchart showing the flow for the controller shown in FIG. 1 to receive an instruction from the user and execute print and scan processing.

The flowchart shown in FIG. 7 corresponds to the process when the user selects a file on the external service provider server 17. The user refers to the display 12 of the image processing apparatus 100 and prints the selected file using the operator 10. The user then selects the folder on the external service provider server 17 and stores the scanned document data in the selected folder.

The process executed by the controller 11 is described next according to the flowchart in FIG. 7.

In FIG. 7, the user performs an operation that selects the external service cooperation function on the screen not shown on the display 12 (step S11). When the operator 10 accepts the user operation, the controller 11 accesses the external service provider server 17 in response to the user operation. The external service provider server 17 provides display data of the external service authentication screen (see FIG. 8) for logging into an external service. The controller 11 displays the provided display data on the display 12 (step S13).

Figure 8:
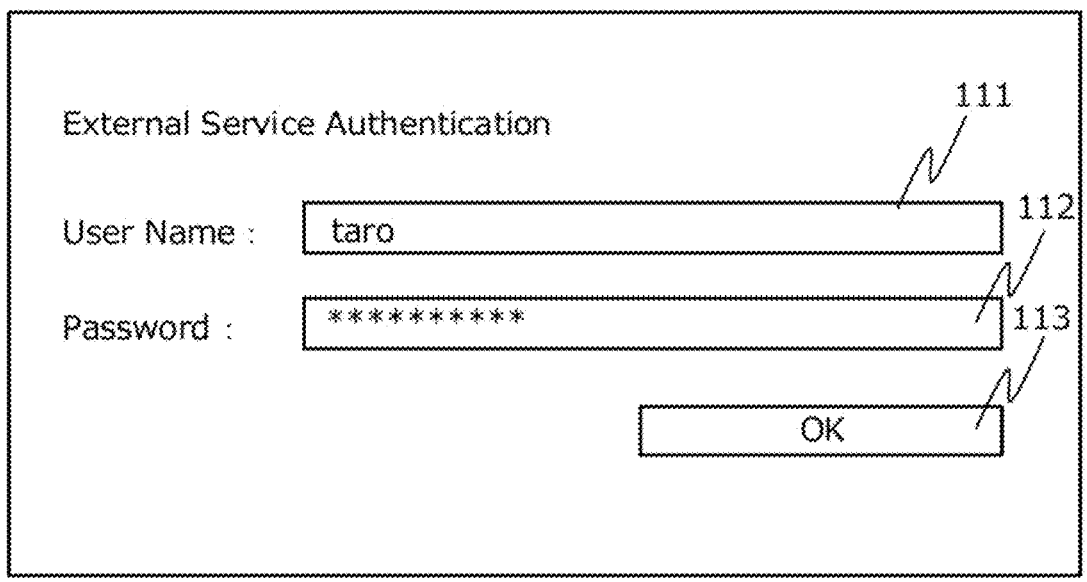
FIG. 8 is a descriptive view showing an example of an external service authentication screen relating to the processing of FIG. 7.

The external service authentication screen shown in FIG. 8 requires the entry of the user name and password as authentication information. The user inputs the user name in the user name input field 111, and the password in the password input field 112 on the displayed external service authentication screen, and the user then taps a "OK" button 113. When the operator 10 accepts these operations, the controller 11 transmits the entered authentication information to the external service provider server 17 (step S15). The external service provider server 17 that has received the authentication information performs user authentication processing.

The authentication information that the user inputs on the external service authentication screen is not limited to the user name and password shown in the example of FIG. 8. For example, when the external service requests the input of a one-time password, the input screen for a one-time password appears instead of a screen for the password and the user name.

When information indicating that the user authentication is successful is received from the external service provider server 17 (YES in step S17), the routine proceeds to step S19. If the authentication fails (NO in step S17), the routine returns to the above described step S13, and stands by (awaits) the re-entry of authentication information on the external service authentication screen.

If the user authentication is successful, the controller 11 stores the authentication key issued by the external service into the memory (step S19). The folder to be displayed in the list is then set in the "My Top" folder that is the root folder of the user (step S21).

Figure 9:
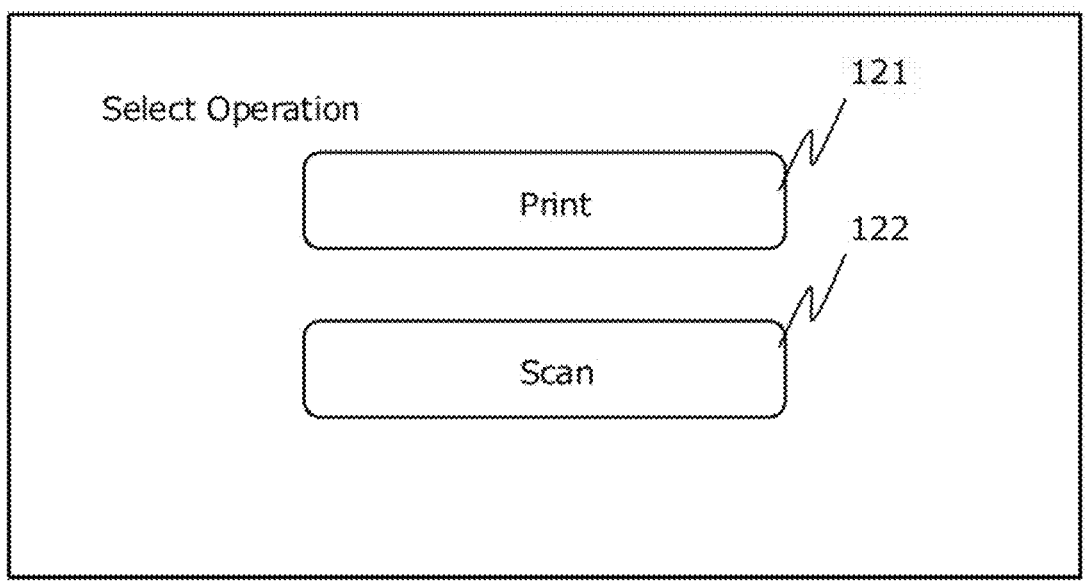
FIG. 9 is a descriptive view showing an example of a processing selection screen relating to the processing of FIG. 7.

The controller 11 displays the process selection screen shown in FIG. 9 on the display 12 (step S23).

As shown in FIG. 9, the process selection screen asks the user to select the print processing and the scan processing. The controller 11 executes the print processing when a "Print" button 121 is tapped. The controller 11 executes the scan processing when a "Scan" button 122 is tapped.

When the operator 10 detects the tapping of the "Print" button 121 on the process selection screen, the routine (process) proceeds to step S27. On the other hand, if tapping of the "Scan" button 122 is detected, the routine proceeds to step S41.

If the selection of the print process is accepted, the controller 11 acquires information relating to the folder list from the external service provider server 17 (step S27). Information relating to the file list is also acquired (step S29). The process will be described in detail below.

The controller 11 displays a print screen (see FIG. 10) for the user to select a print object (or print target) on the display 12 based on the information acquired from the external service provider server 17 (step S31). The controller then accepts the selection of the file for printing by the user on the screen (step S33).

When the operator 10 detects the user has tapped the "Print" button 121 on the print screen (step S35), in response to the detection, the controller 11 downloads the selected file from the external service provider server 17.

Specifically, the controller 11 shows the selected file to the file acquisition interface provided by the external service provider server 17. At this time, the controller 11 shows the authentication key that is acquired from the external service provider server 17 and stored in the memory in the above described step S19.

The controller 11 then downloads the provided file from the external service provider server 17 and performs print processing (step S37).

Figure 10:
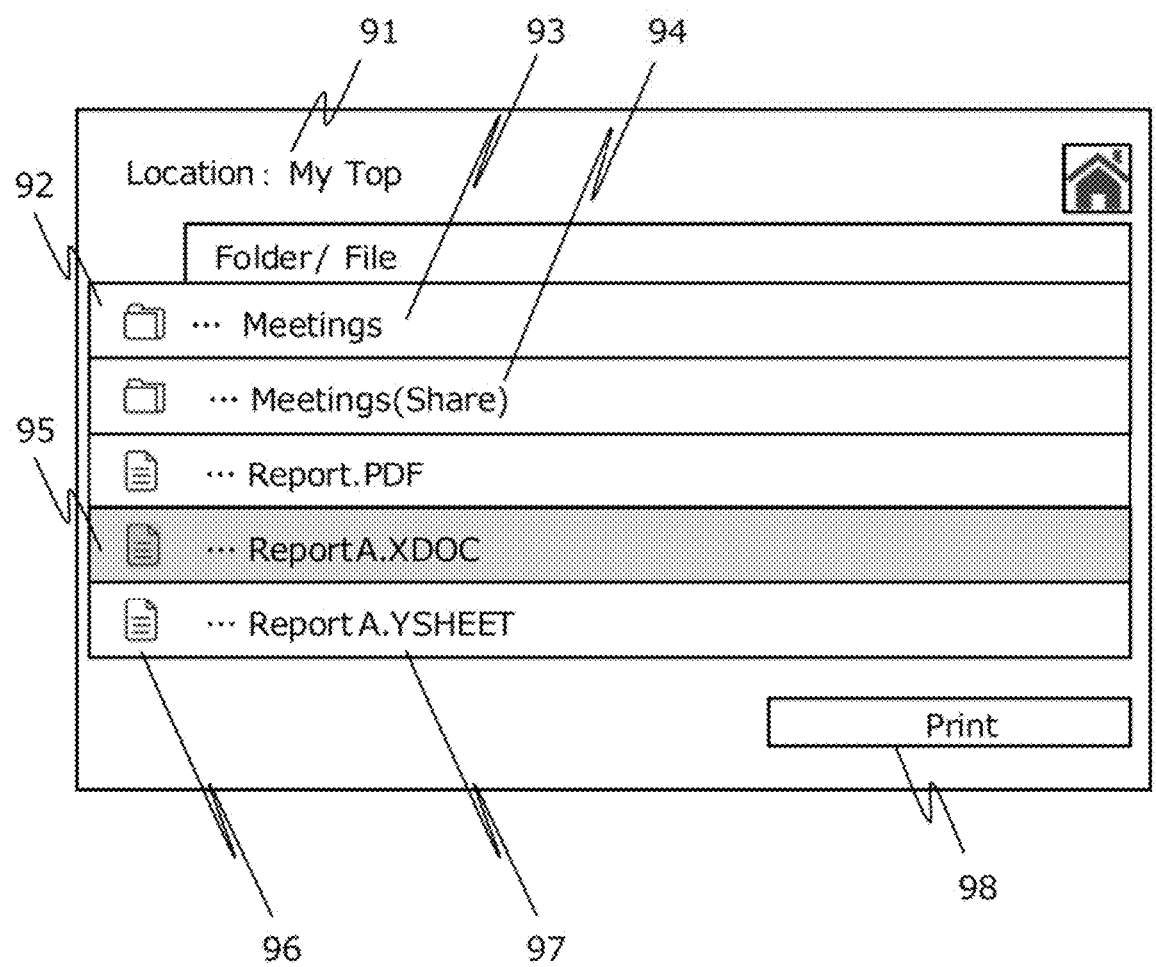
FIG. 10 is a descriptive view showing an example of a screen for accepting selection of a print target when print processing is selected in FIG. 7.

FIG. 10 is a descriptive view showing the print screen relating to step S31 of FIG. 7. As shown in FIG. 10, the folder name that is the list display object or namely, the name of the folder that is selected as a candidate location for storing the file for printing is displayed on the upper portion of the print screen (see reference numeral 91). Below that, the folders and files within the selected folder are displayed. There are two folders in the list display: "Meetings" and "Meetings (Share)".

This corresponds to the rule shown in FIGS. 3A and 3B and FIG. 6.

The controller 11 displays each folder by using the folder icon 92 and the folder names 93 and 94. The folder icon 92 indicates that the display object is a folder. In this embodiment, the controller 11 displays the folder by using a common folder icon even if there are different types of folders. In regards to the folder name, the general folder displays the name of the folder assigned as an attribute without changes. The shared folder is displayed by adding a character string "(Share)" after the name as the attribute based on the rule in FIG. 6.

The user can decide if the folder is a shared folder by whether the character string "(Share)" has been added to the end of the folder name.

Also, the controller 11 displays each file by using a file icon 96 and the file name 97. The file selected by the user as the print target is shown on a reversed (or highlighted) display to allow identifying it from among other files (see reference numeral 95).

The file icon indicates that the display object is a file. In this embodiment, the controller 11 displays the folder by using a common folder icon even if there are different types of files.

In regard to file names, on the basis of the rules shown in FIG. 6, files that are the document X type as the attribute are displayed with a character string ".XDOC" added at the rear of the name as the attribute. Also files that are the spreadsheet Y type as the attribute are displayed with a character string ".YSHEET" added at the end of the file. The other types of file are displayed unchanged with their names as the attribute. The user can easily decide that a file relates to the document X by including the extension ".XDOC" in the file name. The user can also easily decide that a file relates to spreadsheet Y by including the extension ".YSHEET" in the file name.

The "Print" button 98 is a button indicating the start of print processing.

Figure 11:
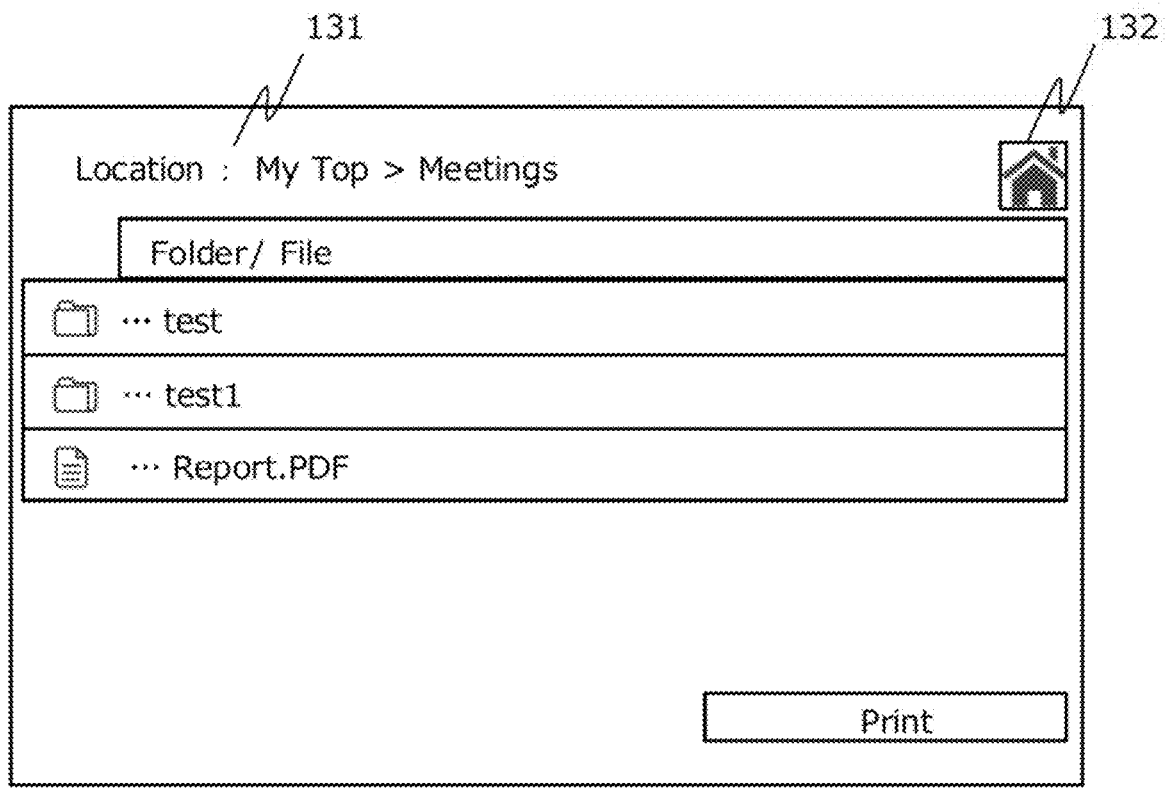
FIG. 11 is a descriptive view showing a different example of the print screen relating to the processing of FIG. 7.

To find a desired file, the user can move to a different folder and display a list. For example, if the operator 10 detects the tapping of the "Meetings" folder on the print screen in FIG. 10, the controller 11 displays the "Meetings" folder in a list as the selected folder. An example of a list display of the selected "Meetings" folder is shown in FIG. 11. In FIG. 11, a folder name as a list display object is displayed on the upper part of the screen (see reference numeral 131). In FIG. 11, there are two folders, "test" and "test1" and one "Report.PDF" file. When "Report.PDF" is selected on this screen and the operator 10 detects the tapping of the "Print" button in the lower part, in response to the detection, the controller 11 executes the print processing of the selected file.

In addition, when the operator 10 detects the tapping of a home button 132 on the right side at the top of the screen, the controller 11 changes the display to the print screen in FIG. 10. Namely, the root folder for "My Top" is shown as a list display.

The flow of the print process is as described above.

Details of a folder list acquisition process shown in steps S27 and S41 in FIG. 7 and a file list acquisition process shown in step S29 are described.

Figure 12:
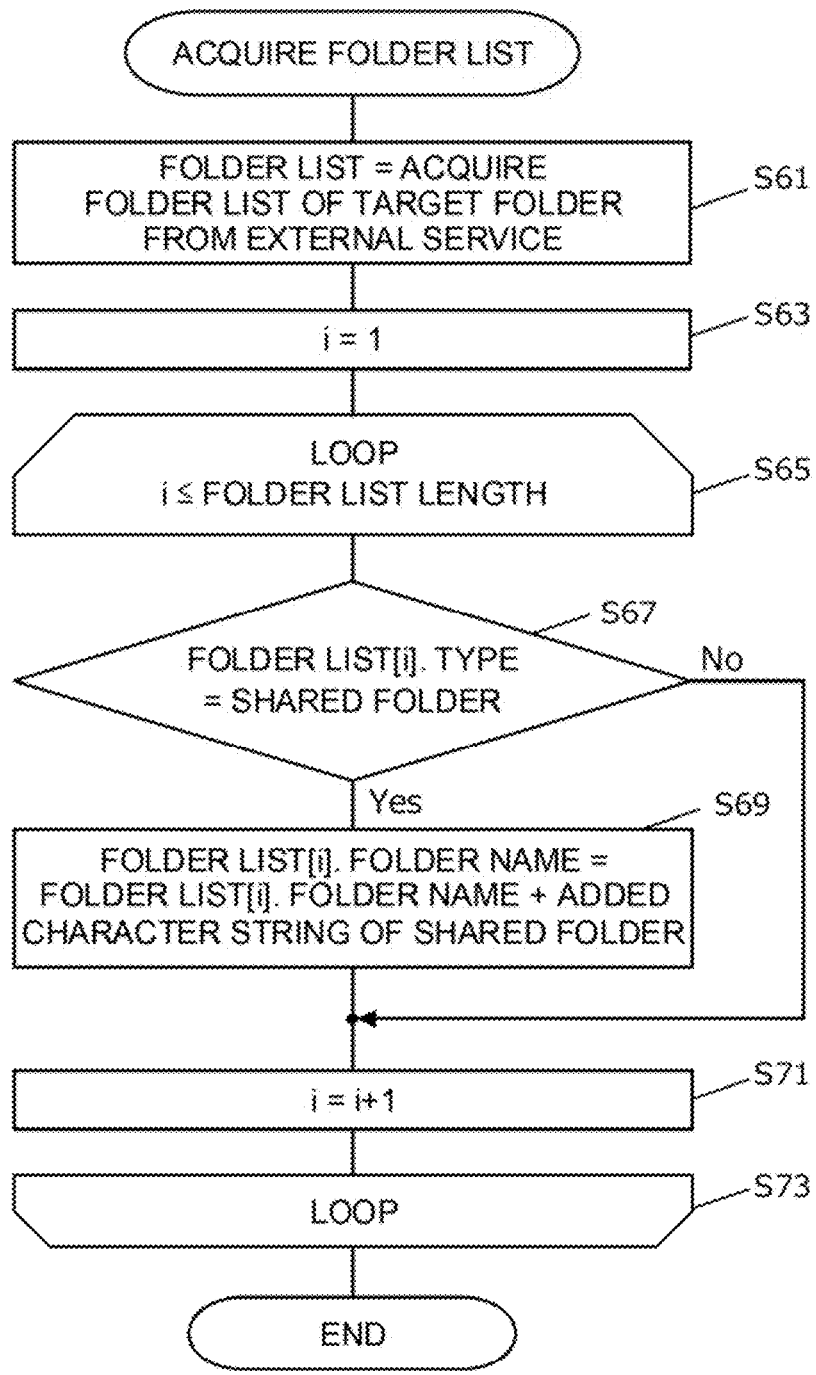
FIG. 12 is a flowchart showing an example of the processing for the controller to acquire a list of folders from an external service in this embodiment.

FIG. 12 is a flowchart showing an example of the process through which the controller 11 acquires a list of folders from the external service provider server 17 in this embodiment. As shown in FIG. 12, the controller 11 acquires the folder list by utilizing an interface for acquiring the folder list provided by the external service provider server 17 (step S61). When acquiring the folder list from the external service provider server 17, the controller 11 shows the authentication key that is acquired from the external service provider server 17 and stored in the memory in step S19 in FIG. 7. The number of folders included in the folder list, or namely the folder list length is revealed when the folder list is acquired.

Next, the controller 11 initializes the value of the temporary variable i used in the folder list acquisition process to 1 (step S63).

The following loop processing in steps S65 to S73 is then executed as long as the value of the temporary variable i is less than or equal to the folder list length.

First of all, the controller 11 checks whether the folder type of the i-th folder in the folder list is a shared folder (step S67). If the folder is a shared folder, the routine proceeds to step S69 and an additional character string "(Share)" corresponding to a shared folder is added to the folder name. The routine subsequently proceeds to step S71.

On the other hand, if the folder is not a shared folder in step S67, the routine proceeds to step S71.

In step S71, the controller 11 increases the value of the temporary variable i by 1, and the routine returns to step S65 of the process.

When the value of temporary variable i exceeds the folder list length, the loop is removed and the process is terminated.

The controller 11 as described above, acquires the folder list from the external service provider server 17, and adds the character string "(Share)" to the shared folder among the acquired folders.

Figure 13:
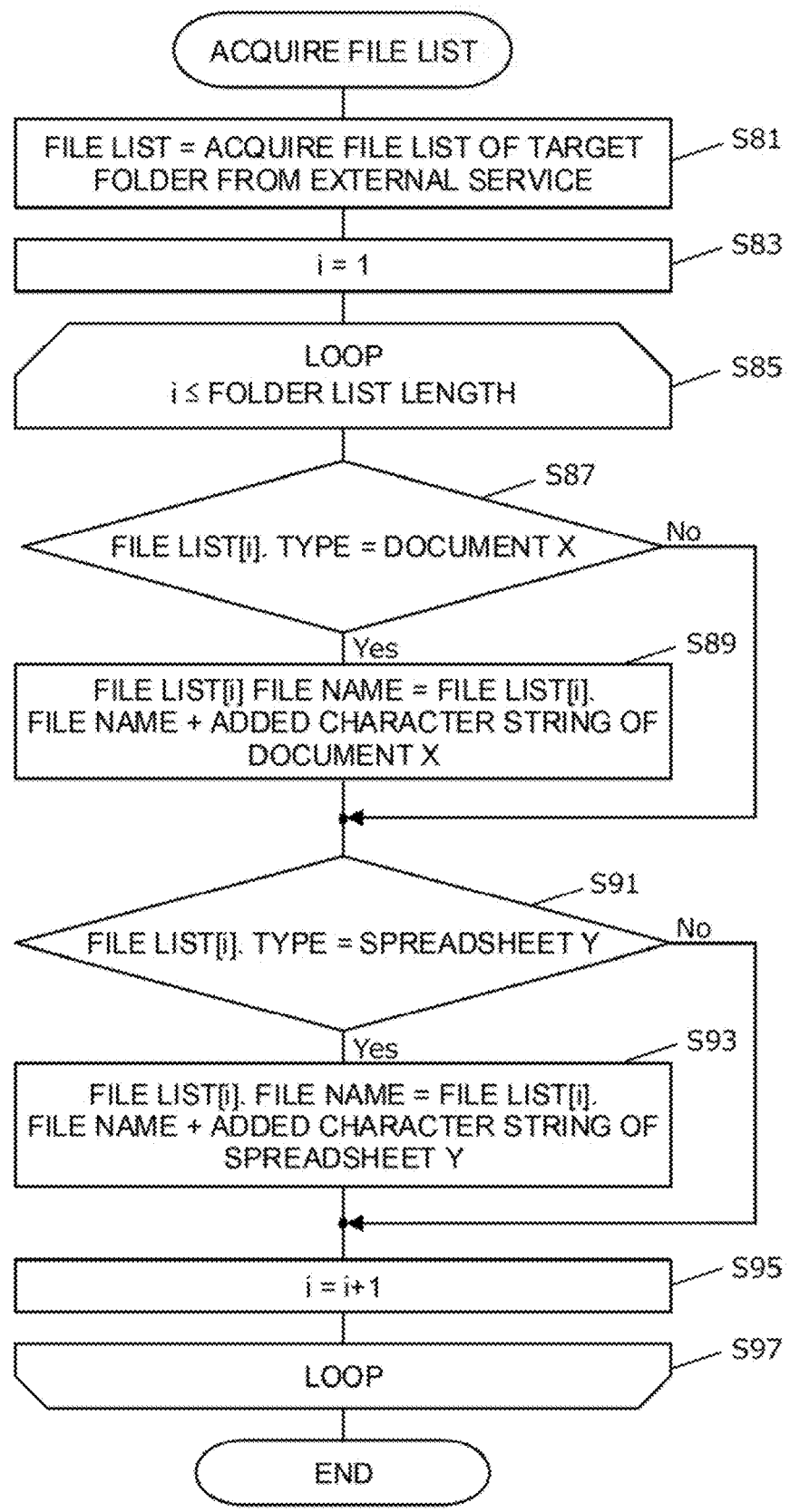
FIG. 13 is a flowchart showing an example of the processing for the controller to acquire a list of files from an external service in this embodiment.

FIG. 13 is a flowchart showing an example of the processing for the controller to acquire a list of files from the external service provider server 17 in this embodiment. As shown in FIG. 13, the controller 11 utilizes a file list acquisition interface provided by the external service provider server 17 to acquire the file list of the object folder (step S81). When acquiring the file list from the external service provider server 17, the controller 11 shows the authentication key that is acquired from the external service provider server 17 and stored in the memory in step S19 in FIG. 7. The number of files included in the file list, or namely the file list length is revealed when the file list is acquired.

Next, the controller 11 initializes the value of the temporary variable i used in the file list acquisition process to 1 (step S83).

The following loop processing in steps S85 to S97 is then executed as long as the value of the temporary variable i is less than or equal to file list length.

First of all, the controller 11 checks whether the file type of the i-th file in the file list is a file relating to the document X (step S87). If the file relates to the document X, the routine proceeds to step S89 and an additional character string (file name extension) ".XDOC" corresponding to the file relating to the document X is added to the file name. The Routine Subsequently Proceeds to Step S91.

However, in step S67, if the file is not related to the document X the routine proceeds to step S91.

In step S91, the controller 11 checks whether the file type of the i-th file in the file list is a file relating to spreadsheet Y. If the file relates to the spreadsheet Y, the routine proceeds to step S93, and an additional character string (file name extension) ".YSHEET" corresponding to the file relating to the spreadsheet Y is added to the file name. The routine subsequently proceeds to step S95.

However, in step S91, if the file is not related to the spreadsheet Y, the routine proceeds to step S95.

In step S95, the controller 11 increases the value of the temporary variable i by 1, and the routine returns to step S85 of the process.

When the value of temporary variable i exceeds the folder list length, the loop is removed and the process is terminated.

As described above, the controller 11 acquires the file list from the external service provider server 17, and adds the character string (file name extension) ".XDOC" to the file relating to the document X among the acquired files. The controller 11 adds the character string (file name extension) ".YSHEET" to the file relating to the spreadsheet Y.

The case where the scan processing is selected in step S25 will be described below by returning to FIG. 7.

When accepting selection of the scan processing, the controller 11 acquires information relating to the folder list from the external service provider server 17 (step S41).

The procedure for acquiring the folder list is the same as that described in step S27 in FIG. 7 and the details are as shown in FIG. 12.

The controller 11 displays a scan screen (Refer to FIG. 14A) for specifying the image file name, file format, and file storage location of the scanned document by the user on the display 12 based on information acquired from the external service provider server 17 (step S43). The controller 11 then accepts the user settings on the scan screen (step S45). Although not shown in FIG. 14A, settings made by the user relating to the image quality of the scanning may be accepted at this stage.

Figure 14A:
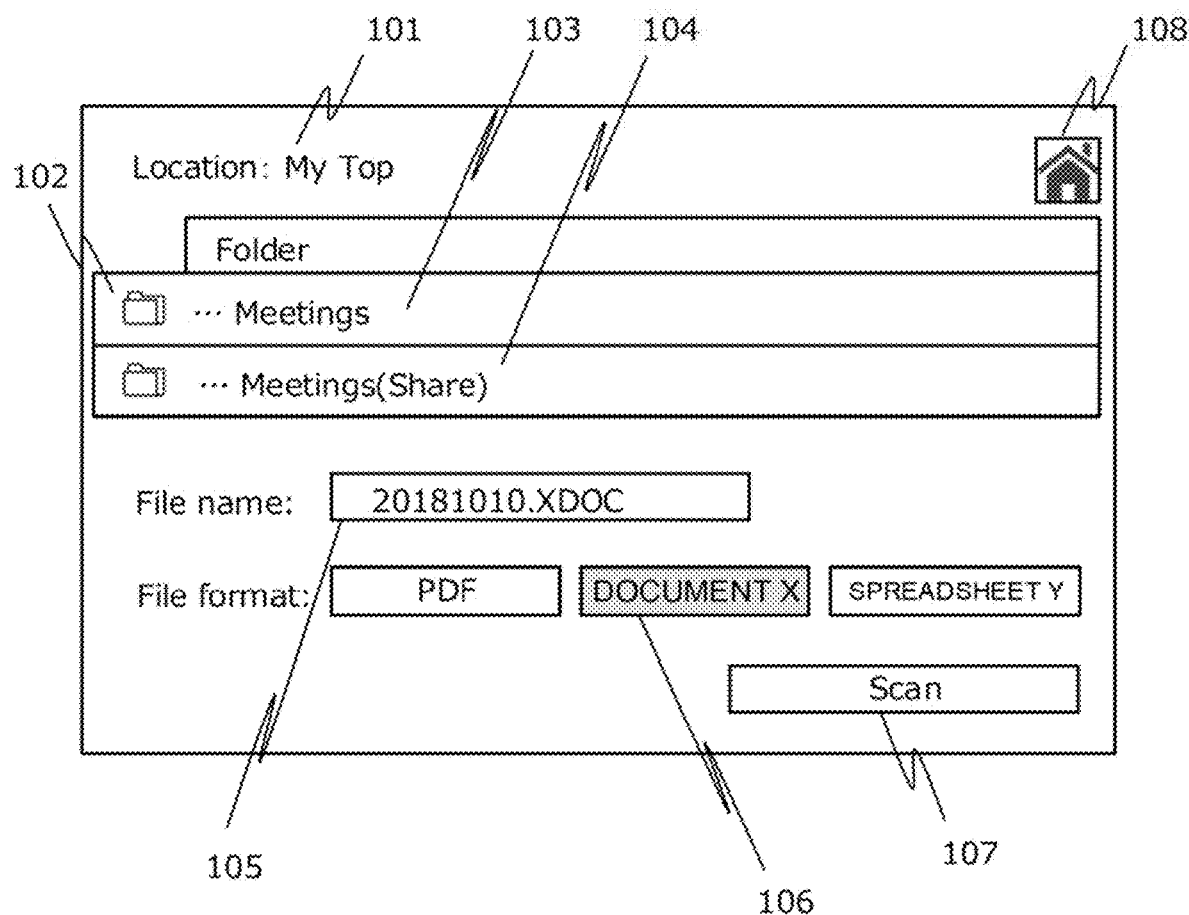
FIG. 14A is a descriptive view showing an example of a screen for accepting a setting relating to scan processing when scan processing is selected in FIG. 7.

FIG. 14A is a descriptive view showing an example of a screen for accepting settings relating to the scan processing. As shown in FIG. 14A, the folder name that is the list display object or namely, the name of the folder selected as a candidate location for storing the file is shown on the upper portion of the scan screen (see reference numeral 101). The folders and files within the selected folder are displayed in the list below the folder name. There are two folders in the list display: "Meetings" and "Meetings (Share)". This arrangement corresponds to the rules shown in FIGS. 3A and 3B, and FIG. 6.

The controller 11 displays each folder by utilizing the folder icon 102 and the folder names 103 and 104, the same as in the print screen shown in FIG. 10. The user can decide if the folder is a shared folder by whether the character string "(Share)" has been added to the end of the folder name.

A file name input field 105 is provided below the folder list. When the user inputs the image file name of the document in this field, the operator 10 accepts the file name that the user input. The controller 11 adds the file name that is input and uploads the image file to the external service provider server 17.

A file format selection button 106 is provided below the file name input field. In this embodiment, the user can select from three formats of Portable Document Format (PDF) file, the document X, and the spreadsheet Y. The controller 11 performs character recognition processing of the scanned document and converts the file format into a file format suitable for the corresponding application. In other words, the controller 11 converts the file format into a file format compatible with the document X, or a file format compatible with the spreadsheet Y, or a file format compatible with acrobat format having embedded text information.

In the example shown in FIG. 14A, the file format conforming to the document X is selected. The controller 11 displays the selected state on a reversed (or highlighted) display.

Figure 14B:
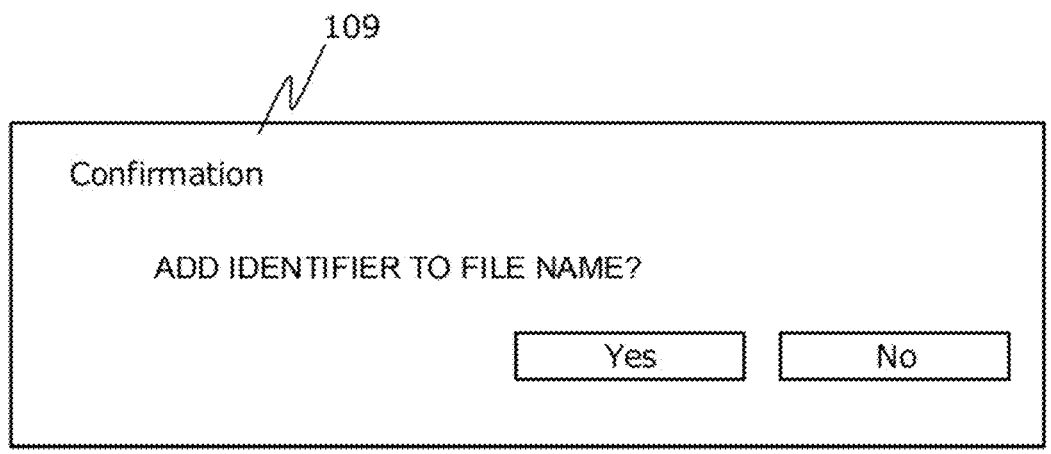
FIG. 14B is a descriptive view showing an example of a check screen shown after the scan button is tapped on the screen in FIG. 14A.

In this embodiment, when the user selects the document X or the spreadsheet Y as the file format, the controller 11 displays a check screen 109 shown in FIG. 14B on the display 12. The check screen displays a confirmation message asking whether to add an extension to the file name.

If the user taps the "Yes" button on the check screen 109, in response to the tap by the user, the controller 11 adds the character string based on the rules shown in FIG. 6 to the file name input in the file name input field 105 and updates the file name. On the other hand, when the user taps the "No" button, the controller 11 does not change the file name.

When the user taps the "Scan" button 107 at the bottom of the scan screen, the controller 11 starts the scan processing according to the settings.

The user can move to a different folder and display a list to find the desired file. For example, if the operator 10 detects that the "Meetings" folder icon has been tapped on the print screen of FIG. 14A, the controller 11 displays the "Meeting folder" in a list as the selected folder. An example of the list display when the "Meeting folder" is selected is shown in FIG. 15.

Figure 15:
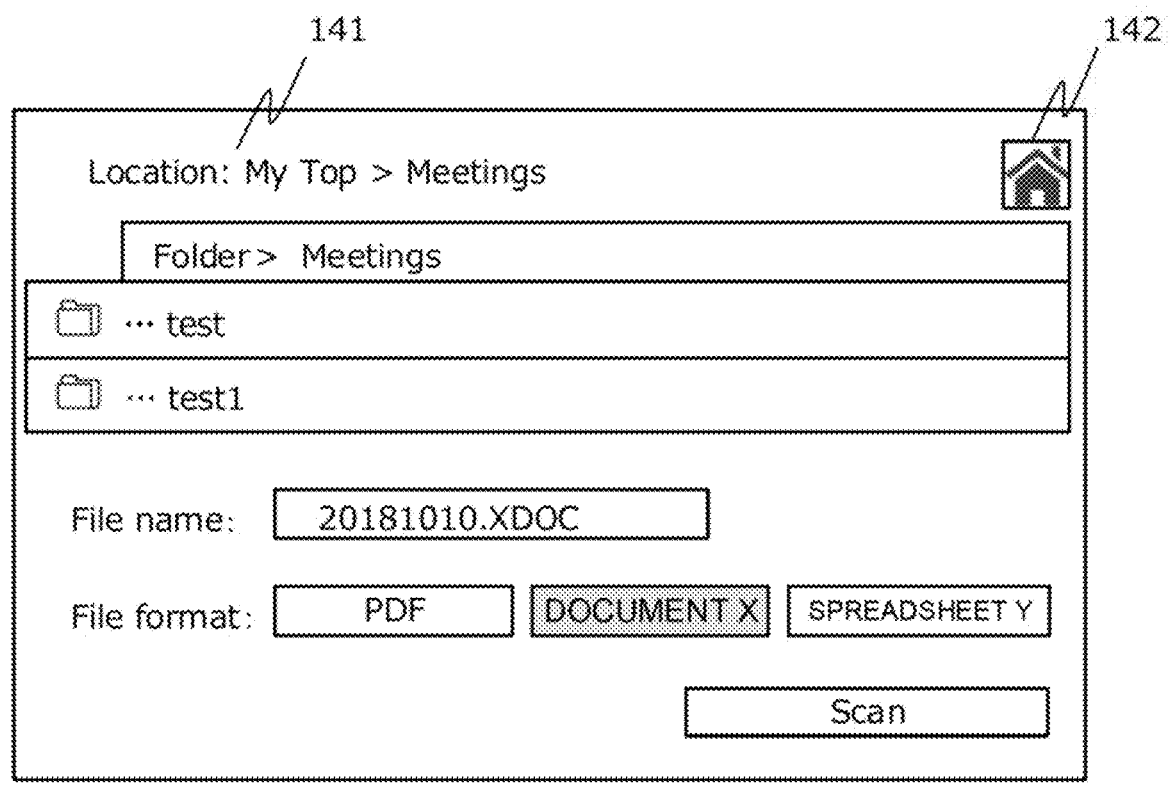
FIG. 15 is a descriptive view showing a different example of a scan screen relating to the processing of FIG. 7.

In FIG. 15, the name of the folder that is an object in the list display is shown at the top of the screen (see reference numeral 141). In FIG. 15, there are two folders "test" and "test 1".

In addition, when the operator 10 detects the tapping of the home button 142 at the upper right side of the screen, the controller changes the display to the scan screen in FIG. 14A. In other words, the root folder for "My Top" is displayed in a list.

The above description of the screen relating to the scan process is now complete. The description now returns to the explanation of the scan processing.

When the user sets a document to be scanned, the sensor not shown in the drawing of the scanner 15 detects the setting of the document (step S47 in FIG. 7). The controller 11 monitors the operating of the "Scan" button on the scan screen in response to the detection of the setting.

When the operator 10 detects the tapping of the "Scan" button (step S49), in response to the detection of the tapping, the controller 11 executes the scan processing (step S51). Namely, the document set in the scanner 15 is scanned, image data of the document is generated based on the settings, and the generated image data is uploaded to the external service provider server 17.

Second Embodiment

In the first embodiment, a character string is added after the name as an attribute of a folder or a file as shown in the examples in FIG. 10 and FIG. 14A.

In the second embodiment however, a different state from the first embodiment is that the user may be able to specify the position to add an identifier to the name. For example, the user may be able to specify adding an identifier to the beginning of the name. It may also be possible to specify adding an identifier within the name. For example, when an external service provides a file name with an extension and the same extension is attached even if the attribute type is different, then an identifier corresponding to a type can be added before the extension.

Third Embodiment

In the first embodiment, as shown in the examples in FIG. 10 and FIG. 14A, the name and the additional character string are displayed as attributes without making any particular distinction between the two.

Unlike the state of the first embodiment, a portion of the additional character string in the third embodiment may be displayed in a display state different from the display state of a portion of the identifier serving as the attribute.

For example, the portion of the additional character string may be displayed in a bold or italic style, the portion of the additional character string may be displayed in a color different from the portion of the identifier, or the portion of the additional character string may be displayed in a flashing state that allows the user to easily recognize the portion of the additional character string.

Fourth Embodiment

In the first embodiment, a character string is added to the display object of the list displayed by the image processing apparatus to make it easy for the user to identify the display object. However, no change is made to the essential file name that is stored in the external service.

To provide a different state, the name of at least one of the folder and the file at the acquisition source of the display object may be changed to a name that allows easily identifying the type.

In the first embodiment, when the user taps the file format selection button 106 on the scan screen shown in FIG. 14A, the controller 11 obtains the user's confirmation on the screen shown in FIG. 14B, and then adds a character string to the file name input to the file name input field 105 to update the file name.

The file name shown on the scan screen shown in FIG. 14A relates to the image data file to be generated from here onward and does not relate to the file already stored in the external service provider server 17.

However, in this embodiment, a button similar to the file format selection button shown in FIG. 14A may for example be arranged on the print screen shown in FIG. 10 or FIG. 11. Consider the case for example, that such type of button is placed on the print screen shown in FIG. 10. Also consider the case that the user taps the corresponding button in a state as shown in FIG. 10 where a file "Report A.XDOC" relating to the document X is selected. The controller 11 in response to the operation requests confirmation from the user by displaying a check screen resembling FIG. 14B. The controller 11 then accesses the external service provider server 17 that stores the "Report A" file relating to the document X and changes the file name to "Report A.XDOC".

Here, the external service provider server 17 provides an interface that accepts file name changes, as well as accepting file acquisition, generation, and update requests. The controller 11 presents the selected file and the file name to be changed to the interface for changing file names. At that time, the controller shows the authentication key acquired from the external service provider server 17 and stored in the memory in step S19 described above.

The external service provider server 17 changes the name of the object file to the provided name.

The operation is the same for folders.

Therefore as described above:

(i) The image processing apparatus of the present invention includes a list acquirer that acquires display objects that are at least one of a folder and a file including names and type serving as attributes, a display name decider that decides whether a name relating to a display object is named according to the type, on the basis of predetermined rules for displaying the list, and if the name is not a name according to a type, adds an identifier to the name according to the type, and a list generator that displays the display object in the list by utilizing the name for the acquired display object or the name that the identifier is added to the name based on a decision by the display name decider.

In the present invention, a list is configured from only a folder, only a file, or both a folder and a file. For the sake of brevity, in this specification, this list may be described as a folder and/or a file. In many cases there is a plurality of folders or files but a list includes one or more folders and/or one or more files.

In this specification, "name" is an attribute for identifying an object folder or file. If equivalent, then whether the item name of the attribute is "name" is not an issue. "Name" is usually defined as a character string (in this specification, all elements of the string consisting of one or more characters, numbers, symbols, etc. that are not limited to characters, are called a character string). Generally, the name is named or in other words defined by the user for the purpose of uniquely identifying the object folder or file from among other folders or files. In some cases, the computer may assign names based on predetermined rules. However, as stated among the problems to be solved by the present invention, a given name might accidentally overlap with the name of another folder or file.

The "Type" is an attribute predetermined for classifying folders and files. If equivalent, then whether the item name of the attribute is "type" is not an issue. The folder type and the file type do not need to correspond. In other words, the folder may be defined by a different standard than for a file. In the above described embodiment, the type of the folder is based on whether it is shared or not. The type of file on the other hand, is determined based on whether it is the document X, the spreadsheet Y, or others.

Also, the list acquirer acquires a folder or a file as a list display object. The list acquisition source may for example even be an external information processing device capable of communicating via a network, etc. as described in the embodiments. However, the list acquisition source is not limited to an external information processing device and may for example be an external device capable of exchanging data via a bus standard such as a universal serial bus (USB). Alternatively, the list acquisition source may be a data storage such as a hard disk drive (HDD) within the image processing apparatus.

Just as the word "acquire" indicates, the list acquirer need not necessarily have a function to generate a folder or file. Along with accessing to an already existing folder or file having attributes added such as name and type and detecting its presence, the list acquirer need only have a function to acquire the attribute assigned to the folder or the file.

In this specification, the list acquirer, display name decider, and list generator perform functions mainly by executing the processing program stored in the memory by hardware configured from a Central Processing Unit (CPU) or Micro Processing Unit (MPU) and memory. In other words, the hardware resources and software resources are coordinated together to achieve functions.

Further, the list display destination may for example be a display device such as an operating panel in the image processing apparatus, however the list display destination is not limited to this arrangement. For example, the display may be rendered on an external device capable of communicating with the image processing apparatus via a network, etc. The list generator of the image processing apparatus however controls the operation to display a folder and a file on the list. Here, the list generator need not control all of the content on the display screen for the external device. The list may be displayed as a portion of the display screen, and the list generator may control a portion of the list.

Whether the name is given according to the type is intended to determine whether the user who sees the name displayed in the list, can recognize the type from the name. However, whether the user can recognize it or not depends on the individual user, so the display name decider decides the name, on the basis of the predetermined rules. A specific example as described in the embodiment is deciding based on whether the name of the file contains an extension, if there is no extension, a decision is made that the type cannot be recognized from the name of the file.

In another example, based on whether the name includes a character string predetermined according to type, if the name does not include a character string corresponding to type, a decision is made that the type cannot be recognized from the name. In the example in the embodiment, a decision is made based on whether the folder is a shared folder is described.

The identifier is a character string for uniquely identifying the display object.

Further, the preferred states of the present invention are described.

(ii) In the present invention, the image processing apparatus may further include a position specifier that accepts designation of the position where the display name decider adds the identifier to the name.

The identifier can in this way be added to the position specified by the user in a position from the beginning to the end of the name.

(iii) The image processing apparatus of the present invention may further include a display state specifier that accepts the specifying of the display state of the identifier, and the list generator displays the portion of the name and the portion of the identifier in different states, and displays the portion of the identifier in the display state accepted by the display state specifier.

The portion of the name of the attribute and the portion of the identifier of the attribute can in this way be displayed in different states so the user can easily recognize the identifier. For example, the identifier can be displayed in bold or italic style, or the identifier color can be changed, or the identifier can be shown as a flashing display.

(iv) The image processing apparatus of the present invention may include an attribute changer for replacing at least one of the name of the folder and the file at the acquisition source of the display object with a display name having an identifier added by the display name decider. After replacement in the list, the list acquirer may acquire the name of the display object in the acquisition source, and the list generator may display the name of the display object acquired after replacement in the list.

In this way, not limited to just adding an identifier to the display objects in the list displayed by the image processing apparatus, at least one of the name of the folder and the file in the acquisition source of the display object can also be changed to a name allowing easily identifying the file type.

(v) In the present invention, the attribute changer causes the list generator to generate display data asking the user to confirm whether to execute the change before changing the name of the display object at the acquisition source. After asking for user confirmation, the attribute changer accepts the user's instruction for the required confirmation, and decides whether to change the name at the acquisition source based on the instructions accepted from the user.

Operating errors can in this way be reliably prevented by asking for user confirmation before changing the name of the display object at the acquisition source.

(vi) The image processing apparatus of the present invention may further include at least one of a display for performing a display based on the data generated by the list generator and a communicator for transmitting the data to an external device coupled via a network.

In this way, the display object list to which the identifier is added can be displayed on at least one of the display provided in the image processing apparatus and the external device coupled via the network.

(vii) A list display method provided as a different state of the present invention includes a step that a controller of an information processing device acquires at least one of a folder and a file as display object that includes a name and a type as an attribute, a step that the controller decides whether a name relating to the display object is named according to the type, on the basis of predetermined rules for displaying the list, and if not a name according to type, adds an identifier according to type to the name, and a step that the controller displays the display object in the list by utilizing a name for the acquired display object or the name added the identifier based on the decision.

The states of the present invention may include combinations of any of the above described plurality of states.

Besides the embodiment described above, various modifications of the present invention are allowed which should not be construed as falling outside the scope of the present invention. The present invention encompasses all manner of variations and adaptations within the range of the claims and equivalent meaning.

DESCRIPTION OF THE REFERENCE NUMERALS

10: Operator
11: Controller
12: Display
13: Printer
14: Communication interface circuit
15: Scanner
16: Image data generator circuit
17: External service provider server
17a: Paper feed tray
17b: Hand insertion tray
18a, 18b, 18c: Discharge tray
21: URL display
22: User display
100: Image processing apparatus

What is claimed is:

1. An image processing apparatus comprising:
a list acquirer that acquires a display object that is at least one of a folder and a file, the display object including a name and a type serving as an attribute;
a display name decider that decides whether the name relating to the display object is named according to the type, on the basis of predetermined rules for displaying a list, and if not the name according to the type, adds an identifier according to the type to the name;
a list generator that displays the display object in the list by utilizing the name for the acquired display object or the name that the identifier is added to; and
an attribute changer that replaces at least one of a name of a folder and a file in an acquisition source of the display object with a display name that the identifier is added to by the display name decider, wherein:
in a case where the list includes display objects with given names, but of different types, that accidentally overlap each other, the list generator displays each of the display objects on the basis of a decision by the display name decider;
after replacement, the list acquirer acquires the name of the display object in the acquisition source, and the list generator displays on the list by utilizing the name of the display object acquired after the replacement; and
the attribute changer causes the list generator to generate display data that asks a user to confirm whether to perform changing before changing the name of the display object in the acquisition source, accepts an instruction of the user for a confirmation of the user, and decides whether to change the name in the acquisition source based on the accepted instruction.

2. The image processing apparatus according to claim 1, further comprising a position specifier that accepts a specifying of a position where the display name decider adds the identifier to the name.

3. The image processing apparatus according to claim 1, further comprising a display state specifier that accepts a specifying of a display state of the identifier,
wherein the list generator displays a portion of the name and a portion of the identifier in different states, and displays the portion of the identifier in the display state accepted by the display state specifier.

4. The image processing apparatus according to claim 1, further comprising at least one of a displayer that performs the display based on data generated by the list generator, and a communicator that sends the data to an external device coupled by way of a network.

* * * * *